July 9, 1935.    O. C. BOWES    2,007,154
TRANSPORTATION OF PERISHABLE FOODS
Filed Jan. 31, 1928    2 Sheets-Sheet 1

INVENTOR
Orlando C. Bowes
by his attorneys
Byrnes, Stebbins & Parmelee

July 9, 1935.  O. C. BOWES  2,007,154
TRANSPORTATION OF PERISHABLE FOODS
Filed Jan. 31, 1928   2 Sheets-Sheet 2
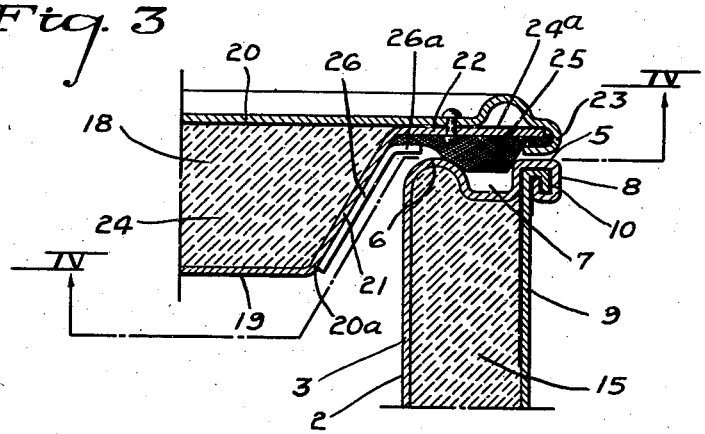
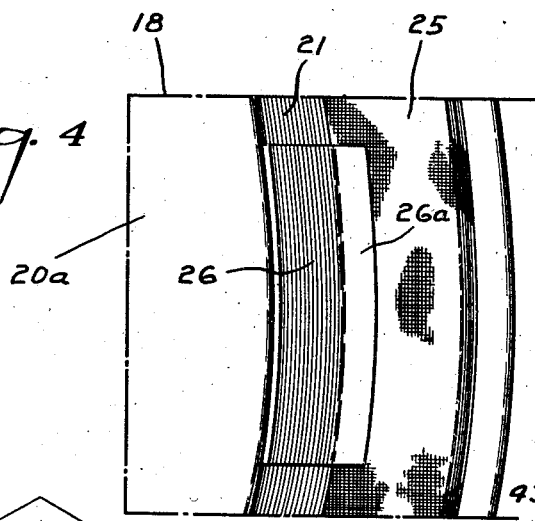
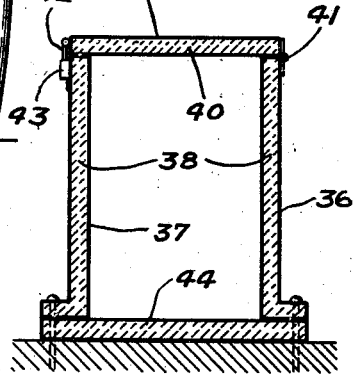
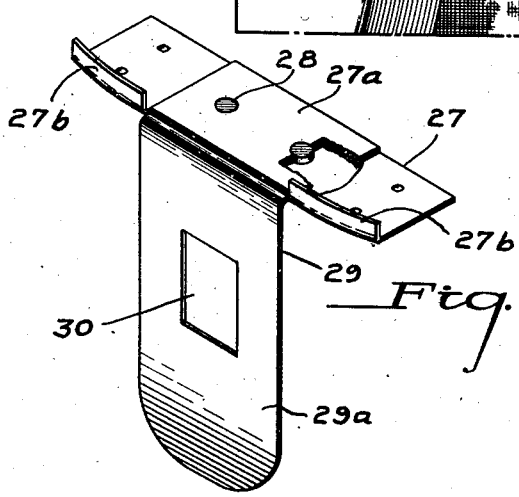
INVENTOR
Orlando C. Bowes
by his attorneys
Byrnes, Stebbins & Parmelee Patented July 9, 1935

2,007,154

UNITED STATES PATENT OFFICE 2,007,154

TRANSPORTATION OF PERISHABLE FOODS

Orlando C. Bowes, Pittsburgh, Pa.

Application January 31, 1928, Serial No. 250,800

14 Claims. (Cl. 220—9)

This invention relates to the handling and transportation of perishable foods, and is especially applicable to the distribution of fresh milk, but is also adaptable for use in the handling of other commodities.

The invention may be readily understood by reference to the accompanying drawings, in which Figure 1 is a top plan view of the container embodying my invention, part of the lid of the container being broken away to show the interior;

Figure 3 is a detail view showing the construction of the walls and lid of the container;

Figure 4 is a plan view of the interior of the cover, the view being taken in the plane of line IV—IV of Figure 3;

Figure 5 is a detail perspective view of a spring catch used on the lid of the container; and Figure 6 is a vertical section through a container of a different construction for use at the house of the customer.

Figure 1:
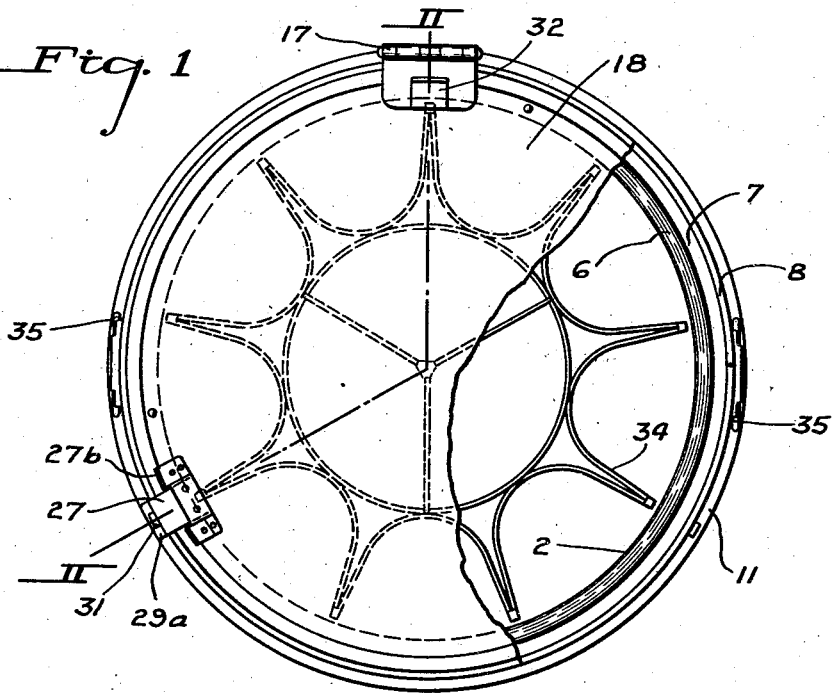

According to my invention, the milk is cooled at the producing dairy to a temperature well below 50° F. but above the freezing temperature, 32° F. It is preferably cooled to a slightly greater extent than the milk is cooled according to the present practice. From the cooler, the milk is run directly into the bottles and the cold milk is sealed in the usual way. As the milk is bottled, it is placed in shipping containers of special construction, having thermally insulated walls and adapted to hold several bottles and which, in warm weather, have been previously cooled. These thermally insulated containers are provided with lids which are substantially air tight and which are also of a thermally insulated construction. After a predetermined number of bottles have been placed in the container and while the milk is still very cold, the covers of the containers are closed.

After the containers have been closed, they may be loaded onto a car or truck and shipped to the city dairy. With a thermally insulated case of proper construction, the temperature of the milk will increase very slightly during the average period of transportation. In fact, if the milk has been properly cooled when placed in the bottles, it can be maintained below 50° F. for forty-eight hours. The size of the shipping case is such that it can be conveniently handled and used on the ordinary milk wagons.

After the cases have been received at the city dairy, they are loaded either directly onto the distributing wagons without being opened, or placed in a cooler until such time as they are to be placed on the wagon. When the driver of the wagon reaches his route, the cases are opened one at a time, and the bottles are distributed to the customers. The milk, at the time that it is delivered to the customer is still cold, notwithstanding the fact that several hours (and perhaps days), have elapsed since the bottles were put in the container.

According to the present invention, it is preferred to provide the users of the certified milk with specially constructed thermally insulated containers at the outside of the house into which the milk can be put by the driver. With the house boxes of a proper construction, the temperature of the milk can be maintained at substantially constant temperatures until the milk is taken into the house.

According to this method, the only refrigeration which the milk receives is that to which it is subjected in the milk coolers at the producing dairy unless the dairy be one not equipped with cooling facilities, in which case ice may be placed around the bottles. After it has once been cooled, further icing is not required, although in extremely warm weather some ice may be placed in the case. By reason of the fact that the milk does not have to be iced in the cases at the producing dairy, at least to any appreciable extent, a very considerable amount of unpleasant labor is eliminated and the cost is greatly reduced. The cases do not have to be iced on the train, and even if there is a delay or the weather is extremely warm, attention does not have to be given to the cases. By reason of the fact that the ice is eliminated, the shipping costs can be reduced and the railroads will accept small shipments in baggage and express cars because damage to other articles in the car from water is eliminated. Even when some ice is used, the water is retained in the cases. The handling of the milk in the loading and unloading of the cars is not so disagreeable because the presence of water is eliminated and weight of ice is also eliminated.

Another big item of cost and trouble is eliminated by reason of the fact that the milk does not have to be iced when it is received at the city dairy, or removed from the cases, but the cases can be loaded onto the wagons without being given any attention. Due to the fact that there is no ice to melt on the wagons, the wagons are not subjected to water, and can be kept dry and sanitary. Furthermore, since a lot of ice does not have to be hauled around, both between the producing dairy and the city dairy, and the city dairy and the consumer, the weight of the load can be very materially reduced with a resulting economy in transportation costs. Since the cases are not intended to receive any quantity of ice, they are smaller than present cases and a greater load can be carried in a smaller space. The cases are watertight, so that even where some ice is placed in the cases, the water will be retained in the cases.

A container to be used for this purpose, in addition to having high heat insulating properties, must be of such construction that it can be produced at a cost fairly commensurate with the cost of the present type of wooden cases used in the distribution of certified milk, and they must be sufficiently rugged to withstand the abusive handling to which a case of this nature is necessarily subjected. One form of container having these and other advantages is disclosed in the accompanying drawings.

The container is preferably formed with an inner shell 2 having a cylindrical side wall 3 and a bottom 4. The shell is preferably pressed from a single piece of sheet metal. It has an outwardly turned annular flange 5 at its upper edge, part of the flange being pressed upwardly to provide an annular bead 6, a part of it being depressed to form an annular channel 7. The extreme outer edge of the flange 5 forms a double rolled seam 8 with the upper edge of a cylindrical outer shell 9. A strip 10, of paper or other suitable material, is rolled into this seam to break the metallic contact between the outer shell and the inner shell so as to reduce the conduction of heat from the outer shell to the flange of the inner shell.

The outer shell is preferably smooth around its upper part, and is preferably provided with an annular bead 11 below this smooth upper portion. The body of the outer shell is preferably corrugated below the bead 11, but the corrugations are preferably of less height than the height of the bead. This corrugated portion of the outer shell is designated 12.

Figure 2:
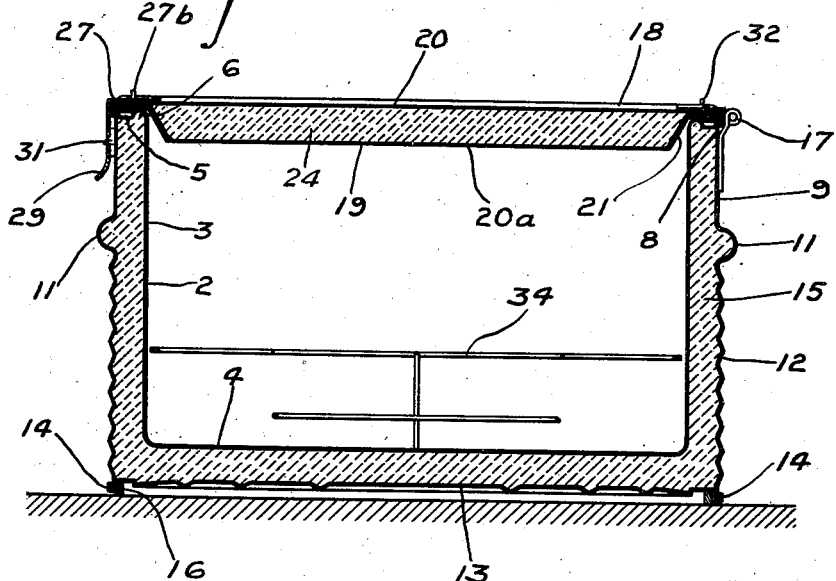
Figure 2 is a transverse vertical section in the plane of line II—II of Figure 1.

The outer shell is spaced away from the inner shell and the space between the two is filled with a heat insulating packing, such as animal wool. The space between the two shells is filled before the bottom 13 is applied to the outer shell. The bottom 13 is preferably formed of heavy sheet metal, as is the outer shell 12, and the bottom 13 is roll seamed to the lower edge of the outer shell 12 at 14, this seaming of the bottom being effected after the packing has been placed between the two shells. The packing is designated as 15. The bottom is preferably corrugated or ribbed to provide additional strength, and an iron hoop 16 is spot-welded or otherwise secured to the bottom inside the seam 14. This ring protects the rolled seam 14 and gives rigidity to the bottom of the structure. It also elevates the bottom of the structure above the plane of the surface on which the structure is set, as is clearly indicated in Figure 2, so as to facilitate nesting of the containers, as hereinafter described, and also protect the bottom against wear when the cases are slid over the floor or over one another.

Secured to the outer shell 12 above the bead 11 is a hinge 17. Attached to one leaf of the hinge by spot-welding or by any other suitable method, is a lid, designated generally as 18. The lid 18 is preferably formed of two sheets of metal, a lower one 19, and an upper one 20. The lower piece 19 of the lid has a centrally dished portion 20ª, with upwardly sloping sides 21. At the top of the dished portion is an annular horizontal flange 22 which fits against the upper member 20, and rivets passing through this flange and the top, secure the two members together. The upper member 20 has a curled periphery 23 that assists in holding the rubber gasket, hereinafter described, in place. The space between the dished portion 20 and the upper member is filled with heat insulating material 24. A paper gasket 24ª breaks the direct contact between flange 22 and the upper member, thereby affording additional thermal insulation.

Retained on the under side of the lid is an annular gasket 25 which is preferably made of sponge rubber. This gasket is held in place by the curled edge 23 of the upper member and by clamping pieces 26 spot-welded or otherwise secured to the sloping sides 21 of the dished portion of the member 19. These clips or clamping members 26 are placed at intervals around the lid and have horizontal portions 26ª for engaging the rubber. This construction is clearly shown in Figures 3 and 4.

When the lid is closed the rubber gasket engages the bead 6 at the top of the inner shell of the structure and is compressed thereagainst to provide a substantially hermetic-seal between the cover and the body of the container. The gasket may also be compressed into the groove 7, to better seal the container and allow some of the rubber to be displaced when the lid is forced down. This contact, being non-metallic, is heat insulating. Being airtight, it prevents the circulation of air into and out of the container. This is a valuable sanitary feature, as well as a valuable heat insulating feature in that it excludes dust and dirt from the bottles inside the container. To renew the rubber gasket, it is merely necessary to spread the end portions of the clips 26 and slightly raise the curled edge 23 of the upper member of the lid. The gaskets can be readily renewed when necessary.

Carried on the outside of the lid 18 are one or more straps 27 which have a centrally raised portion 27ª, as best shown in Figure 5. The raised portion 27ª has one or more openings 28 therein. Inserted under the portion 27ª of the strap 27 is one end of a clip 29 which is preferably made of resilient metal. Solder, poured into the openings 28 serves to detachably hold the clips on the cover. To replace a clip, it is merely necessary to melt out the solder and remove the old clip. The clips 29 have a downwardly projecting tongue portion 29ª in which is an opening 30 for cooperation with a catch member 31 secured to the outside of the outer shell 12. Each catch member is preferably in the form of a ratchet tooth so that the tongue 29 can ride down over the catch when the lid is being shut until the catch springs through the opening 30. When the catch springs through the opening 30, the lid is held closed and can only be opened by springing the tongue 29 out sufficiently to clear the catch 31. There are preferably two catches and two clips on the cover for cooperation therewith. The construction of catches is such that when the lid is closed and the sealing gasket compressed, the catches exert a continuous downward pull, so that the lid is held tightly shut.

This arrangement for holding the cover closed has several advantages. It permits the cover to be slammed shut and when shut, it is self-locking. The position of the catches is such that the gasket 25 in the cover will be compressed when the cover is closed to insure a tight joint between the cover and the body of the shipping case. Since the members 29 are apt to become damaged in use, there is considerable advantage in having them easily replaceable. By reason of the provision of the bead 11, the hinge on the container and the latching clips are protected. The containers, when placed side by side, cannot damage one another by reason of the provision of the bead 11, and when the containers are pushed against a wall the bead 11 holds the main body of the containers out of contact with the wall. This bead also provides considerable reinforcement to the shell of the shipping case.

In order to facilitate nesting of the containers, each of the clips 27 is preferably provided with an upturned integral lug 27$^b$. A lug 32 is secured to the hinge 17. The lug 32 and the lugs 27$^b$ are so positioned that when one container is set on top of another the lugs of the bottom container will engage against the inside of the hoop 16 of the upper container and thereby interlock the containers when they are stacked.

This interlocking of the containers is a convenient feature when the containers are loaded into a car or wagon, and is especially so because of the round shape of the containers. Because of the fact that the containers are round, instead of rectangular, as are the usual containers for this purpose, the containers can be set in the milk wagon so as to interlock with one another. That is, if there are three rows of containers across a wagon extending in a longitudinal direction, the containers in the middle row can be staggered with reference to those at the sides so that the middle containers will lock or interfit with the side ones and prevent shifting of the containers in the wagon. Since the containers are placed one on top of another, the whole load can be locked in the wagon in this fashion.

Removably placed in each container is a bottle separator of any suitable construction. This separator is designated 34 in Figures 1 and 2 and as shown, is arranged to receive twelve quart size bottles and hold them out of contact with one another, but the number of bottles which the separator will receive can be varied to suit the size of the case, my invention contemplating that a case for pint bottles shall hold twenty-four pint bottles.

Secured to the sides of the container above the bead 11 at diametrically opposite points, are handles 35. These handles, which are of the construction that will normally lie down against the side of the container, are protected from damage by the bead 11. One of these two handles is preferably secured to the shell at points each side of the vertical seam 9$^a$ thereof, to further strengthen the outer shells.

While the container is made of metal sufficiently heavy to withstand the abuse to which an article of this kind is subjected, it is relatively light and its weight compares favorably with the ordinary wooden case used in the shipping of certified milk. A full case, constructed along the lines of the present invention, does not weigh as much as a full wooden case packed with ice. Consequently the invention effects an economy in transportation costs. The entire construction of the case is such as to secure high thermal insulation to the contents inside the casing and at the same time, provide rigidity of construction which enables it to be handled roughly and successfully employed in the shipping of milk or other commodities. The bead 11 protects the parts of the container which would otherwise be most liable to injury, and parts which are apt to become worn or broken, such as the clips 29 or the rubber gasket, can be easily replaced.

The heat insulating strip in the rolled seam 8 is a highly desirable feature because it breaks the metal to metal contact between the inner and outer shells of the container. In addition to this the entire case is preferably coated with aluminum paint. Aluminum paint in addition to its heat reflecting properties, is a quick drying paint which makes its use on an article of this kind highly desirable. The provision of the channel 7 allows the rubber gasket to compress against the bead 6 to form a tight seal between the cover and the body of the casing. The entire construction is such that it can be easily cleaned and kept in repair.

For the customer a heat insulated receptacle is also preferably provided. This receptacle need be of a capacity only sufficient to hold one or two bottles. One suitable form of receptacle is shown in Figure 6. The receptacle comprises an outer shell 36 and an inner shell 37 with a heat insulating packing 38 between the two. Hinged to the top of the receptacle is a cover 39 having a heat insulating packing 40 therein. The hinge for the cover is provided at 41. The cover may be provided with a latch 42 adapted to enter a lock 43 on the outside of the container when the cover is closed. The lock may be of any preferred construction. By providing a suitable lock, the milk can be placed in a receptacle and the lid closed. The milk then cannot be removed from the receptacle except by releasing the lock 43. The receptacle may have a base 44 thereon, by means of which it can be screwed or otherwise attached to the floor of a porch, or otherwise fixed to the house of the consumer. By reason of the thermal insulation in the receptacle, the temperature of the milk can be maintained substantially constant, irrespective of the atmospheric temperature. This prevents the milk from spoiling in the summer time and from freezing in the winter.

While the case embodying the present invention is primarily adapted for the distribution of certified milk, it can be used to advantage in the shipping of other commodities, such as frozen fish, frozen fruits, ice cream packing cases and the like.

I claim:

1. A thermally insulated shipping container comprising an inner shell and an outer shell, the inner shell having a flange at the top thereof, a thermally insulated rolled seam joint between the flange and the outer shell, heat insulating material between the inner and outer shells, and a thermally insulated cover for the container.

2. A thermally insulated metallic shipping case comprising a cylindrical inner shell having an integral bottom and sides, a flange at the top of the inner shell, a cylindrical outer shell, the flange of the inner shell being joined to the top of the outer shell by a thermally insulated rolled seam, a heat insulating material between the two shells, and a separate bottom for the outer shell below the inner shell and secured to the outer said separate bottom providing an arrangement whereby the heat insulating material may be packed between the two shells when the case has been otherwise completed, and a heat insulating cover at the top of the receptacle.

3. A thermally insulated metallic shipping case comprising an inner shell having a bottom and sides, a flange at the top of the inner shell, the inner part of which is raised and the outer part of which is depressed to provide an adjacent bead and channel in the said flange, an outer shell having its upper edge joined to the outer edge of said flange by a rolled seam, a bottom for the outer shell, heat insulating material between the inner and outer shells, a cover for the container having a central portion filled with heat insulating material and having a rim portion, a compressible rubber gasket on the under side of the rim portion adapted to seat on the bead at the top of the inner shell member, and a catch for holding the cover closed.

4. A thermally insulated shipping case, a cover forming a part thereof and comprised of an upper plate and a lower plate, the lower plate being dished, heat insulating material in the dished portion of the lower plate and confined between the two plates, a curled edge on the upper plate, a gasket surrounding the dished portion of the lower plate retained in place by the curled edge of the upper plate, and means secured to the lower plate for engaging the inner edge of the gasket to further retain it in place.

5. A thermally insulated metallic shipping case comprising an inner shell having a bottom and sides, a flange at the top of the inner shell, a cylindrical outer shell spaced away from the inner shell, a rolled seam connecting the flange at the inner shell with the outer shell, a cover for the case, a bottom plate for the outer shell connected thereto by a rolled seam, heat insulating material between the two shells, a reinforcing hoop on the bottom plate for protecting the rolled seam between the bottom plate and the outer casing, and an annular bead on the outer shell for protecting the rolled seam at the top of the outer shell from damage.

6. A thermally insulated shipping case comprising an inner shell having an outwardly turned flange thereon at its top, an outer shell enclosing the inner one and spaced therefrom, the flange of the inner shell being connected with the top of the outer shell, said flange having a bead portion and a channel portion, a cover for the container having a compressible gasket, adapted to seat on the bead portion and be received in the channel portion of the flange, and thermal insulation between the shells.

7. A thermally insulated metallic shipping case comprising an integral inner shell having a bottom and side walls and a flange around the top thereof, an outer cylindrical shell spaced away from the inner one and having its upper end joined to the periphery of the flange on the inner shell whereby the space between the outer and inner shells at the top of the case is closed by the flange and the inner shell suspended in spaced relation to the outer shell, said outer shell being longer than the inner shell and having a bottom therein spaced below the bottom of the inner shell, the space between the two shells being filled with thermal insulation, the bottom for the outer shell being separated from the outer shell and being joined thereto, whereby the thermal insulation may be placed in the space between the two shells and evenly distributed, after which the bottom can be applied, and a hoop secured to the bottom of the outer shell and projecting below the bottom of the outer shell for protecting the joint between the bottom of the outer shell and the cylindrical portion thereof from damage.

8. A thermally insulated metallic shipping case comprising an inner shell, an outer shell surrounding the inner shell and spaced therefrom, the space between the inner and outer shells at the top of the case being closed, a bottom plate for the outer shell joined to the outer shell by a rolled seam, and a hoop on the bottom of the outer shell inside the rolled seam and projecting below the seam for protecting the seam and reinforcing the bottom.

9. A refrigerator comprising an outer metallic casing, and an inner metallic casing, said casings being arranged in spaced telescopic relation and interlocked in heat insulating relation.

10. A refrigerator comprising a metallic outer casing, a metallic inner casing arranged in spaced telescopic relation within said outer casing, the edges of said casings being rigidly joined, and a layer of heat insulating material interposed between said edges.

11. A refrigerator comprising an outer metallic casing, an inner metallic casing adapted to telescope said outer casing in spaced relation thereto, the adjacent edges of said casing being rigidly joined in spaced heat insulating relation, and a layer of heat insulating material disposed between said edges to prevent transmission of heat therebetween.

12. A refrigerator comprising an outer metallic casing, an inner metallic casing adapted to telescope said outer casing in spaced relation thereto, the adjacent edges of said casings being spirally joined to form a rigidly interlocking connection therebetween, and means interposed between said edges for preventing conduction of heat from one of said casings to the other.

13. A thermally insulated metal shipping case comprising a double walled thermally insulated container having a separate bottom joined to the outer wall of the container, a thermally insulated cover on the container, and a reinforcing hoop on the bottom of the container, said hoop being located adjacent the seam between said bottom of the container and said outer wall and projecting below said seam to form a protection for the seam and provide a reinforcement for the bottom of the container.

14. A thermally insulated shipping case comprising an inner shell having an outwardly turned flange thereon at its top, an outer shell enclosing the inner one and spaced therefrom, the flange of the inner shell being connected with the top of the outer shell, said flange having a bead portion and a channel, the meeting edges of the flange and the outer shell forming an upstanding lip constituting the outer side of the channel, the channel being outside the bead portion, a cover on the case, means for holding the cover down, a compressible gasket between the cover and the flange, and heat insulating material between the shells.

ORLANDO C. BOWES.

CERTIFICATE OF CORRECTION.

Patent No. 2,007,154.                                          July 9, 1935.

ORLANDO C. BOWES.

It is hereby certified that error appears in the printed specification of the above numbered patent requiring correction as follows: Page 3, second column, line 11, for "properties" read qualities; and line 67, claim 2, after "outer" insert the word shell; and that the said Letters Patent should be read with these corrections therein that the same may conform to the record of the case in the Patent Office.

Signed and sealed this 20th day of August, A. D. 1935.

Leslie Frazer (Seal)                                        Acting Commissioner of Patents.